(12) United States Patent
Zhu et al.

(10) Patent No.: US 11,405,168 B2
(45) Date of Patent: Aug. 2, 2022

(54) COMMUNICATION METHOD, NETWORK DEVICE, AND TERMINAL DEVICE

(71) Applicant: HUAWEI TECHNOLOGIES CO., LTD., Shenzhen (CN)

(72) Inventors: Jun Zhu, Shenzhen (CN); Qiong Jia, Shanghai (CN); Jiayin Zhang, Shanghai (CN); Lei Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/875,810

(22) Filed: May 15, 2020

(65) Prior Publication Data

US 2020/0280426 A1    Sep. 3, 2020

Related U.S. Application Data

(63) Continuation of application No. PCT/CN2018/110797, filed on Oct. 18, 2018.

(30) Foreign Application Priority Data

Nov. 17, 2017    (CN) .......................... 201711148367.8

(51) Int. Cl.
*H04L 5/00* (2006.01)
*H04W 56/00* (2009.01)

(52) U.S. Cl.
CPC .......... *H04L 5/0094* (2013.01); *H04L 5/0092* (2013.01); *H04L 5/0096* (2013.01); *H04W 56/001* (2013.01)

(58) Field of Classification Search
CPC ... H04L 5/0028; H04L 5/0032; H04L 5/0037; H04L 5/0044; H04L 5/0048;
(Continued)

(56) References Cited

U.S. PATENT DOCUMENTS

2010/0124197 A1    5/2010  Pi
2010/0255851 A1    10/2010 Kwak et al.
(Continued)

FOREIGN PATENT DOCUMENTS

CN    106162913 A    11/2016
CN    106961734 A    7/2017
(Continued)

OTHER PUBLICATIONS

"Correction on physical layer part on TS36.300," 3GPP TSG-RAN2 Meeting #82, Fukuoka, Japan, R2-131618, 12 pages, 3rd Generation Partnership Project, Valbonne, France (May 20-24, 2013).
(Continued)

*Primary Examiner* — Pao Sinkantarakorn
(74) *Attorney, Agent, or Firm* — Leydig, Voit & Mayer, Ltd.

(57) ABSTRACT

This application provides a network device-based communication method, where channel resources are divided according to a specific rule. The method includes: determining, by a network device, at least two channels, where a spacing between center frequencies of two adjacent channels in the at least two channels is a positive integer multiple of a subcarrier spacing or a positive integer multiple of a resource block RB spacing; and communicating, by the network device, by using at least one of the at least two channels. Channel resource division is determined based on the spacing between center frequencies of two adjacent channels, implementing adaptation to an application scenario in which a bandwidth is flexible.

12 Claims, 8 Drawing Sheets

(58) Field of Classification Search
CPC ... H04L 5/0092; H04L 5/0094; H04L 5/0096; H04W 56/001; H04W 74/0833
See application file for complete search history.

(56) References Cited

U.S. PATENT DOCUMENTS

| | | | |
|---|---|---|---|
| 2010/0329384 A1 | 12/2010 | Kwak et al. | |
| 2014/0161052 A1* | 6/2014 | Kazmi | H04L 5/0041 370/329 |
| 2015/0333881 A1* | 11/2015 | Shang | H04L 5/0044 370/328 |
| 2017/0331613 A1 | 11/2017 | Ly et al. | |
| 2019/0089448 A1* | 3/2019 | Jakobsson | H04B 1/40 |
| 2019/0124649 A1* | 4/2019 | Lunttila | H04L 5/001 |
| 2019/0223180 A1* | 7/2019 | Feh | H04L 27/2607 |
| 2020/0028637 A1* | 1/2020 | Wolff | H04L 5/0005 |

FOREIGN PATENT DOCUMENTS

| | | |
|---|---|---|
| JP | 2010522500 A | 7/2010 |
| WO | 2015042858 A1 | 4/2015 |
| WO | 2017121289 A1 | 7/2017 |

OTHER PUBLICATIONS

"CR on introduction of 10MHz channel bandwidth for LAA BS," 3GPP TSG-RAN WG4 Meeting #80bis, Ljubljana, Slovenia, R4-168823, 19 pages, 3rd Generation Partnership Project, Valbonne, France (Oct. 10-14, 2016).

JP/2020-527089, Notice of Reasons for Rejection, dated Jun. 15, 2021.

Samsung, "Wider Bandwidth Operations," 3GPP TSG RAN WG1 Meeting #89, Hangzhou, P.R. China, R1-1708060, total 10 pages, 3rd Generation Partnership Project, Valbonne, France (May 15-19, 2017).

Huawei, "Consideration on channel arrangement for LAA," 3GPP RAN WG4 Meeting #76, Beijing, China, R4-154695, total 3 pages, 3rd Generation Partnership Project, Valbonne, France (Aug. 24-28, 2015).

"PUSCH resource allocation in LAA," 3GPP TSG-RAN WG1 Meeting #85, R1-164495, Nanjing, China, Total 7 pages, 3rd Generation Partnership Project, Valbonne, France (May 23-27, 2016).

\* cited by examiner

COMMUNICATION METHOD, NETWORK DEVICE, AND TERMINAL DEVICE

CROSS-REFERENCE TO RELATED APPLICATIONS

This application is a continuation of International Application No. PCT/CN2018/110797, filed on Oct. 18, 2018, which claims priority to Chinese Patent Application No. 201711148367.8, filed on Nov. 17, 2017. The disclosures of the aforementioned applications are hereby incorporated by reference herein in their entireties.

TECHNICAL FIELD

This application relates to the field of wireless communications technologies, and in particular, to a communication method, a network device, and a terminal device in a wireless communications system.

BACKGROUND

Rapid development of wireless communications technologies leads to a strain on spectrum resources, driving exploration on unlicensed frequency bands. 3GPP respectively introduces a licensed assisted access (LAA) technology and an enhanced licensed assisted access (eLAA) technology in Release-13 (R-13) and Release-14 (R-14), so that an unlicensed spectrum resource is used to a maximum extent with assistance of a licensed spectrum. In 5th-generation (5G) new radio (NR), use of an unlicensed spectrum and a flexible bandwidth is also an indispensable technical means for meeting a service requirement and improving user experience. In view of this, a bandwidth division method needs to be introduced.

SUMMARY

Embodiments of this application provide a communication method, a network device, and a terminal device, and propose a channel resource division method, to adapt to an application scenario in which a bandwidth is flexible.

To achieve the foregoing objective, the embodiments of this application provide the following technical solutions.

According to a first aspect, this application provides a network device-based communication method, where channel resources are divided according to a specific rule. The method includes: determining, by a network device, at least two channels, where a spacing between center frequencies of two adjacent channels in the at least two channels is a positive integer multiple of a subcarrier spacing or a positive integer multiple of a resource block (RB) spacing; and communicating, by the network device, by using at least one of the at least two channels.

The predetermined rule is that a spacing between center frequencies of two adjacent channels is determined based on a channel bandwidth and a subcarrier spacing, or a spacing between center frequencies of two adjacent channels is determined based on a channel bandwidth and a resource block (RB) spacing.

The foregoing predetermined rule may be applicable to a scenario in which a channel bandwidth and a subcarrier spacing, or a channel bandwidth and an RB spacing dynamically change, so that more flexible resource configuration can be implemented.

According to a second aspect, this application provides a terminal device-based communication method. The method includes: searching, by a terminal device, for a synchronization signal from a network device to perform random access; and communicating, by the terminal device, on at least one channel when accessing the network device, where a spacing between center frequencies of each of the at least one channel and another adjacent channel that is configured by the network device is a positive integer multiple of a subcarrier spacing or a positive integer multiple of a resource block RB.

In a possible design, the spacing between center frequencies of two adjacent channels in at least two channels meets the following formula:

Nominal channel spacing =
$$\left\lfloor \frac{BW_{channel(1)} + BW_{channel(2)}}{2 * LCM(BW_{CR}, SCS)} \right\rfloor LCM(BW_{CR}, SCS)[MHz], \text{ where}$$

Nominal channel spacing =
$$\left\lceil \frac{BW_{channel(1)} + BW_{channel(2)}}{2 * LCM(BW_{CR}, SCS)} \right\rceil LCM(BW_{CR}, SCS)[MHz]$$

Nominal channel spacing indicates a spacing between center frequencies of two channels, $BW_{channel(1)}$ and $BW_{channel(2)}$ separately indicate bandwidths of two carriers, $BW_{CR}$ indicates a channel raster, SCS indicates a subcarrier spacing, and $LCM(BW_{CR}, SCS)$ indicates a least common multiple of $BW_{CR}$ and SCS.

In another possible design, the spacing between center frequencies of two adjacent channels meets any one of the following formulas:

Nominal channel spacing = $\left\lfloor \frac{BW_{channel(1)} + BW_{channel(2)}}{0.6} \right\rfloor$ 0.3 [MHz]; or Nominal channel spacing = $\left\lfloor \frac{BW_{channel(1)} + BW_{channel(2)}}{0.36} \right\rfloor$ 0.18 [MHz]; or Nominal channel spacing = $\left\lfloor \frac{BW_{channel(1)} + BW_{channel(2)}}{144} \right\rfloor$ 0.72 [MHz]; or Nominal channel spacing = $\left\lfloor \frac{BW_{channel(1)} + BW_{channel(2)}}{2.88} \right\rfloor$ 1.44 [MHz]; or Nominal channel spacing = $\left\lfloor \frac{BW_{channel(1)} + BW_{channel(2)}}{5.76} \right\rfloor$ 2.88 [MHz].

In still another possible design, the spacing between center frequencies of two adjacent channels in at least two channels meets the following formula:

Nominal channel spacing =
$$\left\lfloor \frac{BW_{channel(1)} + BW_{channel(2)}}{2 * LCM(BW_{CR}, BW_{RB})} \right\rfloor LCM(BW_{CR}, BW_{RB})[MHz]; \text{ or}$$

Nominal channel spacing =
$$\left\lceil \frac{BW_{channel(1)} + BW_{channel(2)}}{2 * LCM(BW_{CR}, BW_{RB})} \right\rceil LCM(BW_{CR}, BW_{RB})[MHz],$$

where

Nominal channel spacing indicates a spacing between center frequencies of two channels, $BW_{channel(1)}$ and $BW_{channel(2)}$ separately indicate bandwidths of two carriers, $BW_{CR}$ indicates a channel raster, $BW_{RB}$ indicates an RB spacing, and $LCM(BW_{CR}, BW_{RB})$ indicates a least common multiple of $BW_{CR}$ and $BW_{RB}$.

In a possible design, the spacing between center frequencies of two adjacent channels meets any one of the following formulas:

$$\text{Nominal channel spacing} = \left\lfloor \frac{BW_{channel(1)} + BW_{channel(2)}}{1.8} \right\rfloor 0.9 \text{ [MHz]; or}$$

$$\text{Nominal channel spacing} = \left\lfloor \frac{BW_{channel(1)} + BW_{channel(2)}}{3.6} \right\rfloor 1.8 \text{ [MHz]; or}$$

$$\text{Nominal channel spacing} = \left\lfloor \frac{BW_{channel(1)} + BW_{channel(2)}}{7.2} \right\rfloor 3.6 \text{ [MHz]}.$$

According to a third aspect, this application provides a network device. The network device includes a processor and a transceiver that is connected to the processor by using a bus, where at least two channels are determined, and a spacing between center frequencies of two adjacent channels in the at least two channels is a positive integer multiple of a subcarrier spacing or a positive integer multiple of a resource block RB spacing; and the transceiver is configured to communicate by using at least one of the at least two channels.

According to a fourth aspect, an embodiment of this application provides a communication apparatus. The communication apparatus has a function of implementing the network device in the foregoing method embodiments. The function may be implemented by hardware, or may be implemented by hardware executing corresponding software. The hardware or the software includes one or more modules corresponding to the foregoing function.

According to a fifth aspect, an embodiment of this application provides a terminal device. The terminal device includes a transceiver and a processor, where the transceiver is configured to search for a synchronization signal from a network device to perform random access; the processor is configured to control the transceiver to communicate on at least one channel when accessing the network device, where a spacing between center frequencies of each of the at least one channel and another adjacent channel that is configured by the network device is a positive integer multiple of a subcarrier spacing or a positive integer multiple of a resource block RB.

According to a sixth aspect, an embodiment of this application provides a communication apparatus. The synchronization signal sending apparatus has a function of implementing the network device in the foregoing method embodiments. The function may be implemented by hardware, or may be implemented by hardware executing corresponding software. The hardware or the software includes one or more modules corresponding to the foregoing function.

According to a seventh aspect, an embodiment of this application provides a computer-readable storage medium including an instruction. When the instruction is run on a computer, the computer is enabled to perform the method according to the first aspect or the second aspect.

According to an eighth aspect, a computer program product including an instruction is provided. When the computer program product is run on a computer, the computer is enabled to perform the method according to the first aspect or the second aspect.

In addition, for technical effects brought by any design manner of the second aspect to the eighth aspect, refer to technical effects brought by different design manners of the first aspect. Details are not described herein again.

These aspects or other aspects of the present invention are clearer and more comprehensible in descriptions of the following embodiments.

DESCRIPTION OF EMBODIMENTS

The following describes a resource indication method provided in this application with reference to the accompanying drawings.

Figure 1:
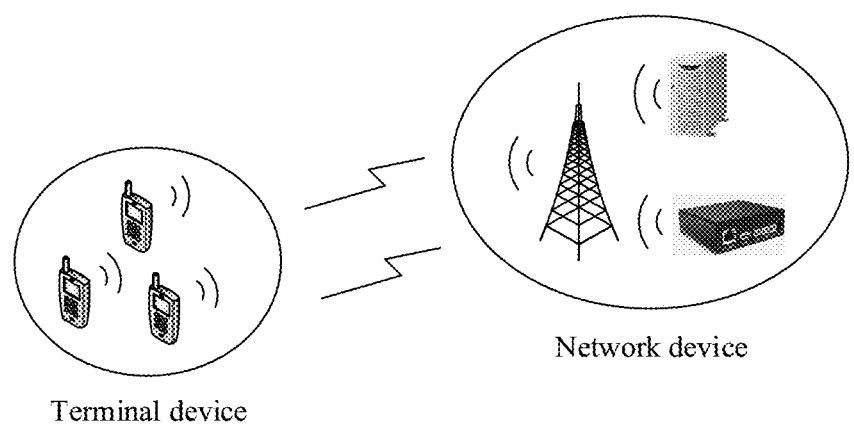
FIG. 1 is a schematic diagram of a possible network architecture according to an embodiment of this application.

FIG. 1 is a simplified schematic diagram of a network architecture to which the embodiments of this application are applied. The network architecture may be a network architecture of a wireless communications system, and may include a network device and a terminal device. The network device and the terminal device are connected by using a wireless communications technology. It should be noted that quantities and forms of terminal devices and network devices shown in FIG. 1 do not constitute a limitation on the embodiments of this application. In different embodiments, one network device may be connected to one or more terminal devices. The network device may further be connected to a core network device, and the core network device is not shown in FIG. 1.

It should be noted that, the wireless communications system mentioned in the embodiments of this application includes, but is not limited to: a narrow band-internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, a fifth-generation mobile communications system, and a future mobile communications system.

In the embodiments of this application, the foregoing network device is an apparatus that is deployed in a radio access network to provide a wireless communication function for the terminal device. The network device may include but is not limited to a base station (BS), a network controller, a transmission and reception point (TRP), a mobile switching center, a radio access point in Wi-Fi, or the like. For example, an apparatus directly communicating with the terminal device through a radio channel is generally a base station. The base station may include a macro base station, a micro base station, a relay station, an access point, a remote radio unit (RRU), or the like in various forms. Certainly, wireless communication with the terminal device may alternatively be performed by another network device that has a wireless communication function. This is not uniquely limited in this application. It should be noted that in different systems, a device with a base station function may have different names. For example, in an LTE network, the device is referred to as an evolved NodeB (eNB, or eNodeB); in a third generation (the 3rd Generation, 3G) network, the device is referred to as a NodeB or the like; and in a 5G network, the device is referred to as a 5G gNB (NR NodeB, gNB).

The terminal device is also referred to as user equipment (UE), a mobile station (MS), a mobile terminal (MT), or the like, and is a device that provides a user with voice and/or data communication, for example, a handheld device, a vehicle-mounted device, a wearable device, or a computing device having a wireless connection function, or another processing device connected to a wireless modem. Currently, for example, the terminal device is a mobile phone, a tablet, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, and the like.

In this application, nouns "network" and "system" may be interchangeably used, and nouns "channel" and "carrier" may be interchangeably used. A person skilled in the art may understand meanings of these nouns. In addition, reference is made to an LTE system for some English abbreviations in this specification, and the English abbreviations may change with network evolution. For specific evolution, refer to a definition in an evolution standard.

Figure 2:
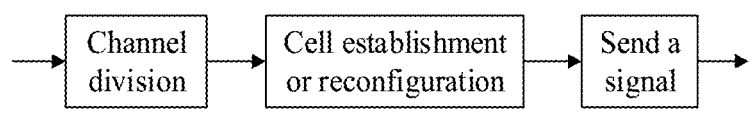
FIG. 2 is a simplified schematic diagram of a communication procedure according to an embodiment of this application.

FIG. 2 is a simplified schematic flowchart of a method for configuring a channel resource by a network device in a wireless communication process.

The network device divides channels, and determines at least two channels, where a spacing between two adjacent center frequencies in the determined at least two channels is a positive integer multiple of a subcarrier spacing or a positive integer multiple of an RB spacing. Next, the network device performs a cell establishment or reconfiguration process. The network device selects a corresponding frequency band based on the determined at least two channels, and determines a synchronization signal, a broadcast signal, a system message, and the like, to configure a cell covered by the network device. After cell establishment or reconfiguration is completed, the network device may send a synchronization signal. The terminal device performs synchronization after searching for and receiving the synchronization signal, and then communicates with the network device.

Figure 3:
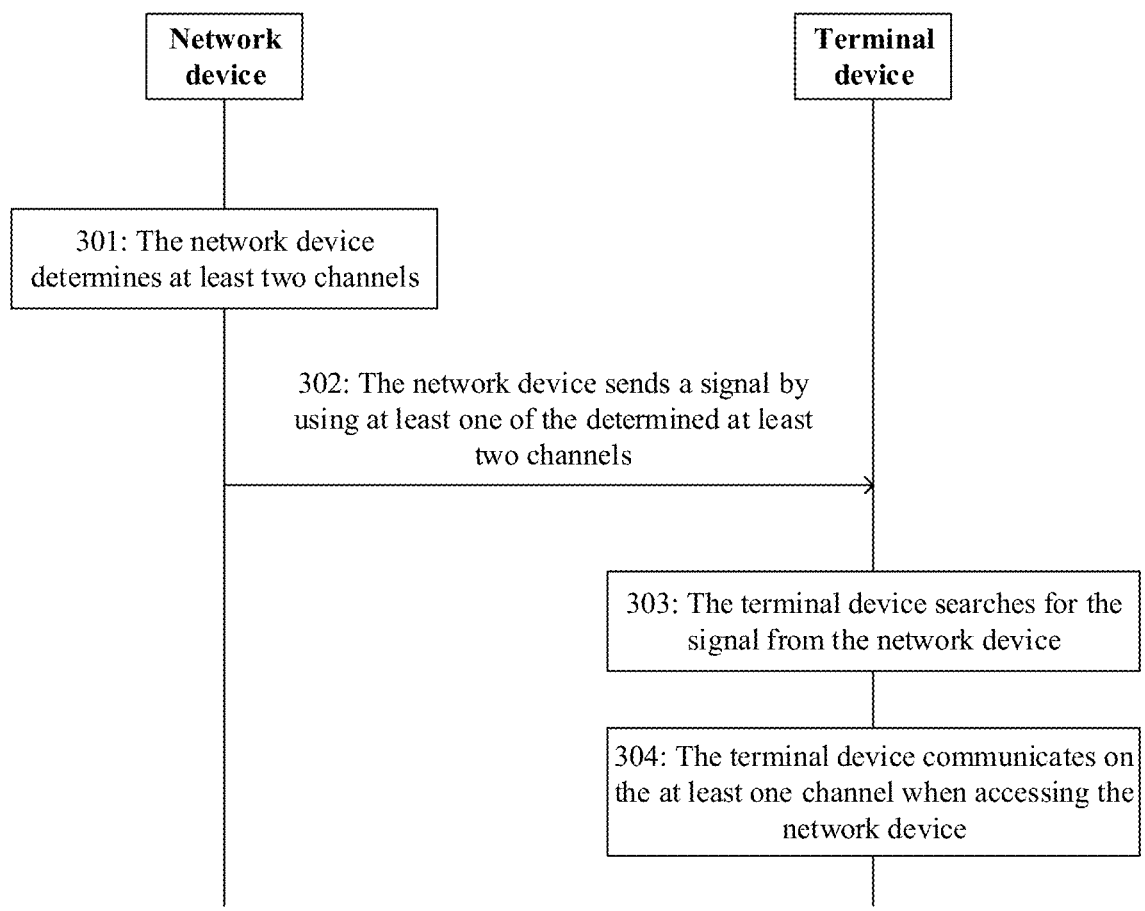
FIG. 3 is a schematic interaction flowchart of a method according to an embodiment of this application.

Then, FIG. 3 is a schematic flowchart of a channel resource configuration method according to an embodiment of this application.

Step 301: A network device determines at least two channels, where a spacing between center frequencies of two adjacent channels in the at least two channels is a positive integer multiple of a subcarrier spacing or a positive integer multiple of a resource block (RB) spacing.

A center frequency is a center of a spectrum resource that corresponds to a channel, and may also be referred to as a center frequency. The center frequency of the channel is an integer multiple of a channel raster, and the channel raster is a minimum granularity of channel division. In different examples, values of center frequencies of channels are different. In an example, a spacing between center frequencies of two adjacent channels is an integer multiple of a subcarrier spacing. In another example, a spacing between center frequencies of two adjacent channels is an integer multiple of a resource block (RB) spacing.

In this embodiment, the center frequency of the channel is already defined in a standard protocol, or configuration of the channel is directly defined in the standard. A manner in which the network device determines the at least two channels is that the network device may determine channel division based on a definition in a standard protocol during cell initialization or reconfiguration, or directly use channel configuration defined in the standard. In addition, the channel configuration follows that a spacing between center frequencies of two adjacent channels in the at least two channels is a positive integer multiple of a subcarrier spacing or a positive integer multiple of an RB spacing. For example, the center frequency of the channel may be represented in a form of a set, and details are described below.

In another embodiment, a manner in which the network device determines the at least two channels is that the network device may divide channels, to dynamically allocate a frequency band, a center frequency, and the like that are occupied by each channel. The network device may select a center frequency from predefined center frequencies, for example, a center frequency set to be described below, and perform channel division. The channel division follows a principle that a spacing between center frequencies of two adjacent channels in the at least two channels is a positive integer multiple of a subcarrier spacing or a positive integer multiple of an RB spacing.

Step 302: The network device communicates by using at least one of the determined at least two channels, and sends a signal.

In this process, the network device may select at least one of the determined at least two channels. In other words, the network device may select one channel from the determined at least two channels, or the network device may select a plurality of channels from the determined at least two channels. After the foregoing configuration is completed, the network device sends a signal, for example, a synchronization signal.

The network device may determine one or more channels for one terminal device, or may separately determine one or more channels for a plurality of terminals.

Step 303: The terminal device searches for a synchronization signal from the network device to perform random access.

Step 304: The terminal device communicates with the network device on the at least one channel when accessing the network device, where a spacing between center frequencies of each of the at least one channel and another adjacent channel that is configured by the network device is a positive integer multiple of a subcarrier spacing or a positive integer multiple of a resource block RB.

In an embodiment, an example in which the spacing that is between center frequencies of two adjacent channels and that is determined by the network device is an integer multiple of the subcarrier spacing is used for description. The spacing (Nominal channel spacing) that is between center frequencies of two adjacent channels and that is determined by the network device meets the following formula:

$$\text{Nominal channel spacing} = \left\lfloor \frac{BW_{channel(1)} + BW_{channel(2)}}{2 * LCM(BW_{CR}, SCS)} \right\rfloor LCM(BW_{CR}, SCS)[\text{MHz}] \quad \text{Formula 1}$$

$BW_{channel(1)}$ and $BW_{channel(2)}$ separately represent bandwidths of two adjacent channels, SCS represents a subchannel spacing, $BW_{CR}$ represents a channel raster, and $LCM(BW_{CR}, SCS)$ represents a minimum common multiple of $BW_{CR}$ and SCS.

In another embodiment, the spacing between center frequencies of two adjacent channels further meets the following formula:

$$\text{Nominal channel spacing} = \left\lceil \frac{BW_{channel(1)} + BW_{channel(2)}}{2 * LCM(BW_{CR}, SCS)} \right\rceil LCM(BW_{CR}, SCS)[\text{MHz}] \quad \text{Formula 2}$$

An example in which the spacing that is between center frequencies of two adjacent channels and that is determined by the network device meets Formula 1 is used for further description below. It may be understood that an application manner in which the spacing that is between center frequencies of two adjacent channels and that is determined by the network device meets Formula 2 is similar to that in Formula 1, and details are not described again. In this embodiment, in resource configuration, division is performed by using a center frequency corresponding to a maximum bandwidth that is supported by a system as a center. For another channel, a transmission bandwidth corresponding to the another channel is determined by a center frequency of the another channel.

When the channel raster is 100 KHz ($BW_{CR}$=100 KHz), and the subcarrier spacing is any one of 15 KHz, 30 KHz, or 60 KHz, the spacing that is between center frequencies of two adjacent channels and that is determined by the network device satisfies the following formula:

$$\text{Nominal channel spacing} = \left\lfloor \frac{BW_{channel(1)} + BW_{channel(2)}}{0.6} \right\rfloor 0.3 \, [\text{MHz}]. \quad \text{Formula 3}$$

Figure 4:
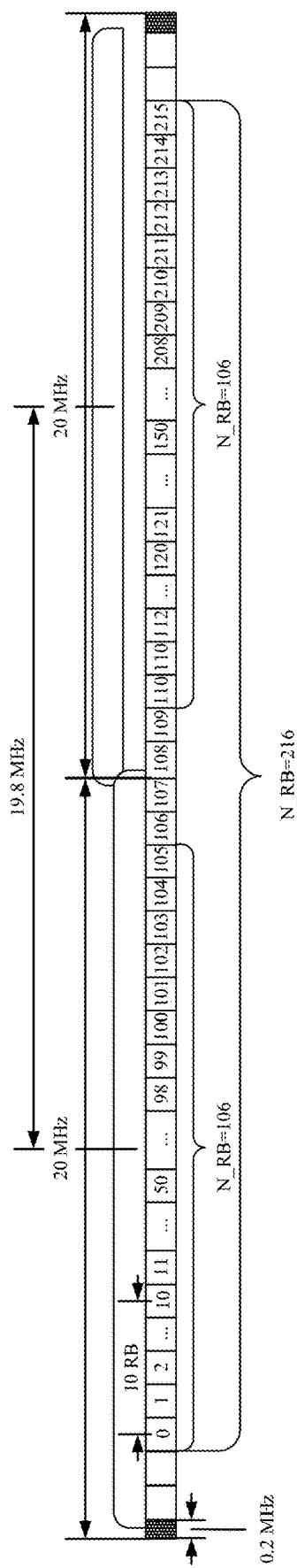
FIG. 4 is a simplified schematic diagram of channel division according to an embodiment of this application.

An example in which a system subcarrier spacing is 15 kHz and flexible bandwidth transmission of 20 MHz or 40 MHz is supported is used for description. It can be learned that a maximum bandwidth supported by the system is 40 MHz. In some embodiments, RB division is performed based on the maximum system bandwidth supported by the system. Referring to FIG. 4, in an example, a channel with a bandwidth of 40 MHz may correspond to about 222 RBs. After a guard spacing is configured, a transmission bandwidth corresponding to the bandwidth of 40 MHz is 216 RBs. The 216 RBs are symmetrically distributed on two sides of a channel center frequency M, and the guard spacings are distributed on two ends of a system bandwidth. For ease of description, in the following and accompanying drawings, a quantity of RBs is represented by N_RB, and the foregoing 216 RBs are numbered RB 0 to RB 215. It may be understood that, in the embodiments provided in this application, RB division and numbering are all examples for description. When a necessary guard spacing is configured, a location of an RB that is used for transmission bandwidth may be offset relative to the example, and is not limited to a configuration manner in the example.

When the network device determines to divide a system bandwidth of 40 MHz into two adjacent channels with bandwidths of 20 MHz, a spacing between center frequencies of the two adjacent channels is 19.8 MHz, and meets Formula 3. As shown in FIG. 4, a transmission bandwidth corresponding to each channel is 106 RBs, which are RB #0 to RB #105 and RB #110 to RB #215. Therefore, after a center frequency location of one channel is determined, a center frequency location of another adjacent channel may be determined.

Next, for a system whose system subcarrier spacing is 30 kHz and that supports transmission in a flexible bandwidth of 20 MHz, 40 MHz, 60 MHz, 80 MHz, or 100 MHz, a maximum bandwidth supported by the system is 100 MHz. After a necessary guard spacing is configured, a transmission bandwidth corresponding to the bandwidth of 100 MHz may be 273 RBs. The 273 RBs are symmetrically distributed on two sides of the channel center frequency, the guard spacings are distributed on two sides of the system bandwidth, and the center frequency is located on RB #136.

Figure 5:
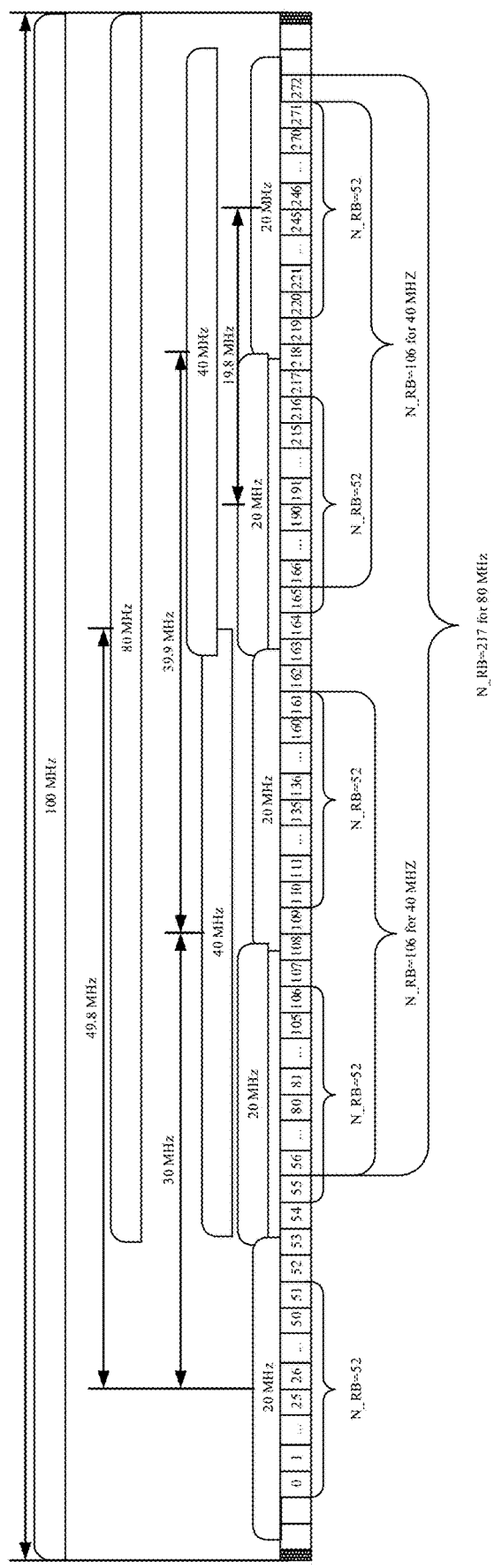
FIG. 5 is a simplified schematic diagram of channel division according to another embodiment of this application.

The system may support transmission in a flexible bandwidth of 20 MHz, 40 MHz, 60 MHz, 80 MHz, or 100 MHz. FIG. 5 shows resource configurations when channels with different bandwidths are combined, or resource configurations when a system bandwidth is divided into a plurality of channels with different bandwidths.

(1) The network device may determine five channels with a bandwidth of 20 MHz. Referring to FIG. 5, after a necessary guard spacing is configured for the five channels with a bandwidth of 20 MHz, a transmission bandwidth of each channel is 52 RBs, a center frequency of a channel 3 in the middle overlaps a center frequency of a maximum system bandwidth of 100 MHz. A spacing between center frequencies of two adjacent channels is 19.8 MHz, which meets a requirement of the foregoing Formula 3. For example, a center frequency is a center, a transmission bandwidth of a channel 1 is RB #0 to RB #51, a transmission bandwidth of a channel 2 is RB #55 to RB #106, a transmission bandwidth of a channel 3 is RB #110 to RB #161, a transmission bandwidth of a channel 4 is RB #165 to RB #216, and a transmission bandwidth of a channel 5 is RB #220 to RB #271. RB #52 to RB #54, RB #107 to RB #109, RB #161 to RB #164, and RB #217 to RB #219 are guard spacings.

(2) The network device may determine one channel with a bandwidth of 20 MHz and two channels with a bandwidth of 40 MHz. In this embodiment, reference may be made to the foregoing center frequency of the channel with a bandwidth of 20 MHz, a spacing between center frequencies of a channel 6 with a bandwidth of 40 MHz and an adjacent channel 1 with a bandwidth of 20 MHz is 30 MHz, and a spacing between center frequencies of a channel 6 with a bandwidth of 40 MHz and a channel 7 with a bandwidth of 40 MHz is 39.3 MHz, which meets a requirement of the foregoing Formula 3. For example, a center frequency is a center. After a necessary guard spacing is configured, a transmission bandwidth of the channel 1 is RB #0 to RB #51, a transmission bandwidth of the channel 6 is RB #56 to RB #161, and a transmission bandwidth of the channel 7 is RB #166 to RB #271.

(3) The network device may determine a channel with a bandwidth of 20 MHz and a channel with a bandwidth of 80 MHz. In this embodiment, reference may be made to the foregoing center frequency of the channel with a bandwidth of 20 MHz. A spacing between center frequencies of a channel 8 with a bandwidth of 80 MHz and an adjacent channel 1 with a bandwidth of 20 MHz is 49.8 MHz, which meets a requirement of the foregoing Formula 3. For example, a center frequency is a center. After a necessary guard spacing is configured, a transmission bandwidth of the channel 1 is RB #0 to RB #51, and a transmission bandwidth of the channel 8 is RB #56 to RB #272.

It may be understood that, in another embodiment, the system may further determine a channel combination of other bandwidths. For example, the system may support a channel with a bandwidth of 40 MHz and a channel with a bandwidth of 60 MHz. In various channel combinations, a spacing between center frequencies of two adjacent channels meets Formula 3. In addition, in another embodiment, after a necessary guard spacing requirement is met, a center frequency of each of the foregoing channels may be offset relative to the center frequency. Correspondingly, a location of the transmission bandwidth may also be offset.

It should be noted that, this application imposes no limitation on relative locations of channels with different bandwidths in the foregoing channel combinations, and is not limited to the foregoing combinations. Other configuration manners are not described one by one herein.

When the channel raster is 180 KHz ($BW_{CR}$=180 KHz), and the subcarrier spacing is any one of 15 KHz, 30 KHz, or 60 KHz, the spacing that is between center frequencies of two adjacent channels and that is determined by the network device satisfies the following formula:

$$\text{Nominal channel spacing} = \left\lfloor \frac{BW_{channel(1)} + BW_{channel(2)}}{0.36} \right\rfloor 0.18 \, [\text{MHz}] \quad \text{Formula 4}$$

An example in which the system supports transmission in a flexible bandwidth of 20 MHz, 40 MHz, 60 MHz, 80 MHz, or 100 MHz is used for description. In resource configuration, division is performed by using a center frequency corresponding to a maximum carrier bandwidth supported by a system as a center. For a smaller carrier, a transmission bandwidth corresponding to the smaller carrier is determined after each center frequency is determined.

(1) The network device may determine five channels with a bandwidth of 20 MHz, and a spacing between center frequencies of two adjacent channels is 19.98 MHz, meeting a requirement of Formula 4. After a necessary guard spacing is configured for the five channels with a bandwidth of 20 MHz, an RB corresponding to a transmission bandwidth of each channel may be determined. For example, in a system that meets Formula 2, a spacing between center frequencies of two adjacent channels is 20.16 MHz.

(2) The network device may determine one channel with a bandwidth of 20 MHz and two channels with a bandwidth of 40 MHz, where a spacing between center frequencies of the channel with a bandwidth of 20 MHz and an adjacent channel with a bandwidth of 40 MHz is 29.88 MHz. A spacing between center frequencies of two adjacent channels with a bandwidth of 40 MHz is 39.96 MHz, which meets a requirement of Formula 4. For example, in a system that meets Formula 2, a spacing between center frequencies of a channel with a bandwidth of 20 MHz and an adjacent channel with a bandwidth of 40 MHz is 30.06 MHz, and a spacing between center frequencies of two adjacent channels with a bandwidth of 40 MHz is 40.14 MHz.

(3) The network device may determine a channel with a bandwidth of 20 MHz and a channel with a bandwidth of 80 MHz, where a spacing between center frequencies of the two channels is 49.86 MHz, and meets a requirement of Formula 4. For example, in a system that meets a requirement of Formula 2, a spacing between center frequencies of a channel with a bandwidth of 20 MHz and an adjacent channel with a bandwidth of 80 MHz is 50.04 MHz.

(4) The system bandwidth of 100 MHz may be further divided in another manner. Referring to Table 4, another division manner in a flexible bandwidth is described as an example.

TABLE 1

| Combination | Channel number | Channel bandwidth |
|---|---|---|
| 1 | Channel 1 | 40 MHz |
|   | Channel 2 | 20 MHz |
|   | Channel 3 | 40 MHz |
| 2 | Channel 1 | 40 MHz |
|   | Channel 2 | 40 MHz |
|   | Channel 3 | 20 MHz |
| 3 | Channel 1 | 40 MHz |
|   | Channel 2 | 60 MHz |
| 4 | Channel 1 | 60 MHz |
|   | Channel 2 | 40 MHz |

It may be understood that the foregoing channel division manner is merely an example for description. When the foregoing manner is applied, another division manner may be further determined. This is not limited in this application.

In still another embodiment, the resource configuration method provided in this application may be further applied to a high-frequency scenario. When a channel raster is 720 KHz ($BW_{CR}$=720 KHz), a spacing between center frequencies of carriers of two adjacent channels meets a requirement of the foregoing Formula 2 or Formula 3. The following uses Formula 2 as an example to describe different subcarrier spacings.

When a system subcarrier spacing is 240 KHz, the spacing that is between center frequencies of two adjacent channels and that is determined by the network device meets the following formula:

$$\text{Nominal channel spacing} = \left\lfloor \frac{BW_{channel(1)} + BW_{channel(2)}}{1.44} \right\rfloor 0.72 \, [\text{MHz}] \quad \text{Formula 5}$$

When a system subcarrier spacing is 480 KHz, the spacing that is between center frequencies of two adjacent channels and that is determined by the network device meets the following formula:

$$\text{Nominal channel spacing} = \left\lfloor \frac{BW_{channel(1)} + BW_{channel(2)}}{2.88} \right\rfloor 1.44 \, [\text{MHz}] \quad \text{Formula 6}$$

When a system subcarrier spacing is 960 KHz, the spacing that is between center frequencies of two adjacent channels and that is determined by the network device meets the following formula:

$$\text{Nominal channel spacing} = \left\lfloor \frac{BW_{channel(1)} + BW_{channel(2)}}{5.76} \right\rfloor 2.88 \ [\text{MHz}] \quad \text{Formula 7}$$

For example, a system bandwidth is 2.16 GHz, bandwidth utilization is 88%, and a transmission bandwidth is 1.9008 GHz.

Figure 6:
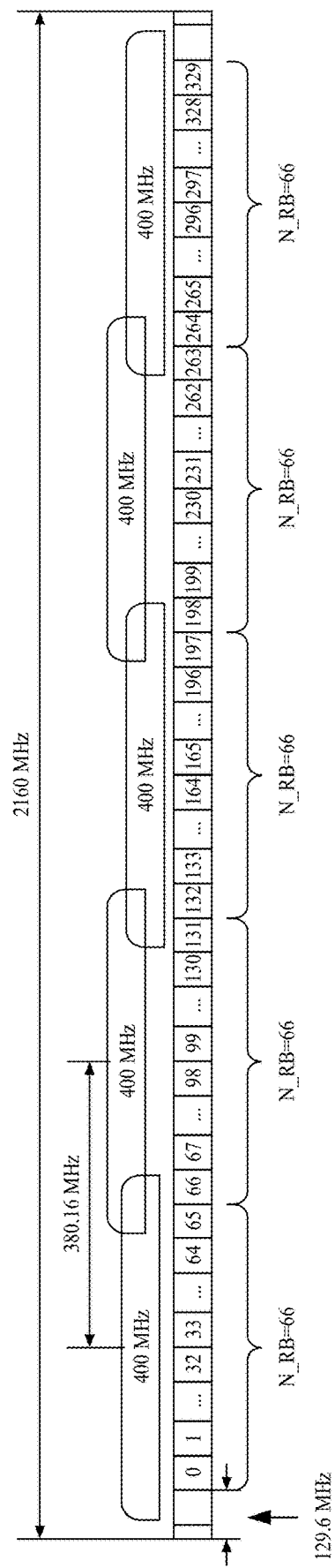
FIG. 6 is a simplified schematic diagram of channel division according to another embodiment of this application.

For example, a subcarrier spacing is 480 KHz, and the network device determines five channels with a bandwidth of 400 MHz. For example, referring to FIG. 6, the 1.9008 GHz transmission bandwidth corresponds to 330 RBs. When no guard spacing is configured, each channel with a bandwidth of 400 MHz corresponds to 66 RBs. When a guard spacing is configured, a transmission bandwidth corresponding to each channel with a bandwidth of 400 MHz is smaller than 66 RBs and depends on a size of the configured guard spacing. A transmission bandwidth used for data transmission may be, for example, 65 RBs, 64 RBs, or 60 RBs. When five channels with a bandwidth of 400 MHz are determined, a spacing that is between center frequencies of two adjacent channels and that is determined by the network device is 380.16 MHz, which meets a requirement of Formula 6. For example, in a system that meets Formula 2, a spacing between center frequencies of two adjacent channels is 381.6 MHz.

Then, an example in which the spacing that is between center frequencies of two channels and that is determined by the network device is an integer multiple of an RB spacing (or may be understood as an RB bandwidth) is used for description. The spacing that is between center frequencies of two channels and that is determined by the network device meets the following formula:

$$\text{Nominal channel spacing} = \left\lfloor \frac{BW_{channel(1)} + BW_{channel(2)}}{2 * LCM(BW_{CR}, BW_{RB})} \right\rfloor LCM \ (BW_{CR}, BW_{RB}) \ [\text{MHz}] \quad \text{Formula 8}$$

$BW_{channel(1)}$ and $BW_{channel(2)}$ separately indicate bandwidths of two carriers, $BW_{CR}$ indicates a channel raster, $BW_{RB}$ indicates an RB spacing, and $LCM(BW_{CR}, BW_{RB})$ indicates a least common multiple of $BW_{CR}$ and $BW_{RB}$.

Alternatively, a spacing between center frequencies of two adjacent channels meets the following formula:

$$\text{Nominal channel spacing} = \left\lceil \frac{BW_{channel(1)} + BW_{channel(2)}}{2 * LCM(BW_{CR}, BW_{RB})} \right\rceil LCM \ (BW_{CR}, BW_{RB}) \ [\text{MHz}] \quad \text{Formula 9}$$

An example in which the spacing that is between center frequencies of two adjacent channels and that is determined by the network device meets Formula 1 is used for further description below. It may be understood that an application manner in which the spacing that is between center frequencies of two adjacent channels and that is determined by the network device meets Formula 2 is similar to that in Formula 1, and details are not described again.

When the channel raster is 100 KHz ($BW_{CR}$=100 KHz) and the subcarrier spacing is 15 KHz, the RB spacing is $BW_{RB}$=15 KHz*12=180 KHz, and the spacing that is between center frequencies of two adjacent channels and that is determined by the network device meets the following formula:

$$\text{Nominal channel spacing} = \left\lfloor \frac{BW_{channel(1)} + BW_{channel(2)}}{1.8} \right\rfloor 0.9 \ [\text{MHz}] \quad \text{Formula 10}$$

When the channel raster is 100 KHz ($BW_{CR}$=100 KHz) and the subcarrier spacing is 30 KHz, the RB spacing is $BW_{RB}$=30 KHz*12=360 KHz, and the spacing that is between center frequencies of two adjacent channels and that is determined by the network device meets the following formula:

$$\text{Nominal channel spacing} = \left\lfloor \frac{BW_{channel(1)} + BW_{channel(2)}}{3.6} \right\rfloor 1.8 \ [\text{MHz}] \quad \text{Formula 11}$$

When the channel raster is 100 KHz ($BW_{CR}$=100 KHz) and the subcarrier spacing is 60 KHz, the RB spacing is $BW_{RB}$=60 KHz*12=720 KHz, and the spacing that is between center frequencies of two adjacent channels and that is determined by the network device meets the following formula:

$$\text{Nominal channel spacing} = \left\lfloor \frac{BW_{channel(1)} + BW_{channel(2)}}{7.2} \right\rfloor 3.6 \ [\text{MHz}] \quad \text{Formula 12}$$

Figure 7:
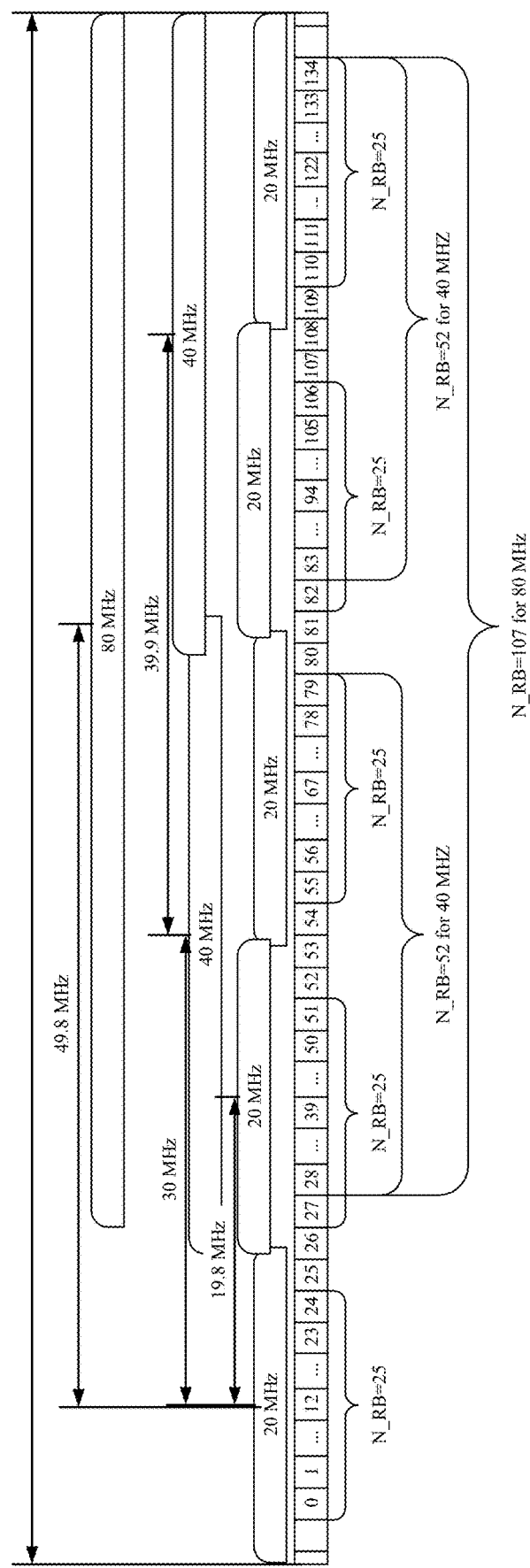
FIG. 7 is a simplified schematic diagram of channel division according to another embodiment of this application.

An example in which the subcarrier spacing is 30 KHz and transmission in a flexible bandwidth of 20 MHz, 40 MHz, 60 MHz, 80 MHz, or 100 MHz is supported is used for description. Referring to FIG. 7, after the guard spacing is configured, a channel with a bandwidth of 20 MHz corresponds to 52 RBs, a channel with a bandwidth of 40 MHz corresponds to 106 RBs, a channel with a bandwidth of 60 MHz corresponds to 162 RBs, a channel with a bandwidth of 80 MHz corresponds to 217 RBs, and a channel with a bandwidth of 100 MHz corresponds to 273 RBs. For ease of description, the 273 RBs are numbered RB #0 to RB #272, and a center frequency of the channel with a bandwidth of 100 MHz is located in RB #136.

(1) The network device may determine five channels with a bandwidth of 20 MHz. Referring to FIG. 7, after a necessary guard spacing is configured for the five channels with a bandwidth of 20 MHz, a transmission bandwidth of each channel is 52 RBs, a center frequency of a channel in the middle overlaps a center frequency of a maximum system bandwidth of 100 MHz. A spacing between center frequencies of two adjacent channels is 19.8 MHz, which meets a requirement of the foregoing Formula 10. For example, a center frequency is a center. After the guard spacing is configured, transmission bandwidths of the five channels are respectively: RB #0 to RB #51, RB #55 to RB #106, RB #110 to RB #161, RB #165 to RB #216, and RB #220 to RB #271. In another embodiment, in a system that meets Formula 8, a spacing between center frequencies of two adjacent channels is 21.6 MHz.

(2) The network device may determine one channel with a bandwidth of 20 MHz and two channels with a bandwidth of 40 MHz, where a spacing between center frequencies of the channel with a bandwidth of 20 MHz and an adjacent channel with a bandwidth of 40 MHz is 29.7 MHz. A spacing between center frequencies of two adjacent channels with a bandwidth of 40 MHz is 39.6 MHz, which meets a requirement of Formula 10. For example, a center frequency is a center. After the guard spacing is configured, transmission bandwidths of the three channels are respectively: RB #0 to RB #51, RB #55 to RB #160, and RB #165 to RB #270. In another embodiment, in a system that meets Formula 8, a spacing between center frequencies of a channel with a bandwidth of 20 MHz and an adjacent channel with a bandwidth of 40 MHz is 31.5 MHz, and a spacing between center frequencies of two adjacent 40 MHz channels is 41.4 MHz.

(3) The network device may determine a channel with a bandwidth of 20 MHz and a channel with a bandwidth of 80 MHz, where a spacing between center frequencies of the two channels is 49.5 MHz, and meets a requirement of Formula 10. For example, a center frequency is a center. After the guard spacing is configured, transmission bandwidths of the two channels are respectively: RB #0 to RB #51 and RB #55 to RB #271. In another embodiment, in a system that meets Formula 8, a spacing between a channel with a bandwidth of 20 MHz and an adjacent channel with a bandwidth of 80 MHz is 51.3 MHz.

(4) It may be understood that 100 MHz may be further divided in a plurality of manners. Referring to Table 2, an example of another form of channel combination in a flexible bandwidth is described. For RB configuration in each channel combination, refer to the foregoing method. Details are not described herein again.

TABLE 2

| Combination | Channel | Channel bandwidth |
|---|---|---|
| 1 | Channel 1 | 40 MHz |
|   | Channel 2 | 20 MHz |
|   | Channel 3 | 40 MHz |
| 2 | Channel 1 | 40 MHz |
|   | Channel 2 | 40 MHz |
|   | Channel 3 | 20 MHz |
| 3 | Channel 1 | 40 MHz |
|   | Channel 2 | 60 MHz |
| 4 | Channel 1 | 60 MHz |
|   | Channel 2 | 40 MHz |

The following separately describes, by using an example, that a relative location of a value in a set that is of center frequencies that are optional for the channel bandwidth meets the foregoing formulas. The following center frequency set is predefined in a standard protocol, and the network device may communicate by using a center frequency in the set. Center frequencies of an uplink channel and a downlink channel meet the following requirements:

$$F_{DL}=F_{DL\_low}+0.1(N_{DL}-N_{Offs-DL})$$

$$F_{UL}=F_{UL\_low}+0.1(N_{UL}-N_{Offs-UL})$$

$F_{DL}$ represents a downlink carrier frequency, $F_{UL}$ represents an uplink carrier frequency, $N_{DL}$ represents a downlink evolved universal terrestrial radio access network (E-UTRA) absolute radio frequency channel number (EARFCN), and $N_{UL}$ represents an uplink EARFCN. For example, value ranges of parameters in the foregoing formulas are as follows:

| E-UTRA operating band (Operating Band) | Downlink (Downlink) | | | Uplink (Uplink) | | |
|---|---|---|---|---|---|---|
| | $F_{DL\_low}$ [MHz] | $N_{Offs-DL}$ | Range of $N_{DL}$ (Range of $N_{DL}$) | $F_{UL\_low}$ [MHz] | $N_{Offs-UL}$ | Range of $N_{UL}$ (Range of $N_{UL}$) |
| 46 (NOTE 3) | 5150 | 46790 | 46790 to 54539 | 5150 | 46790 | 46790 to 54539 |

The channel center frequency is selected from any one or a combination of the following sets.

In a 5 GHz frequency band, a subcarrier spacing is any one of 15 kHz, 30 kHz, or 60 kHz. For example, when a channel bandwidth (channel bandwidth) is 40 MHz, an optional channel center frequency set includes at least:

Set 1: $N_{DL}=N_{UL}=\{n-2, n-1, n, n+1, n+2 | n=47190$ ($F_{DL}=F_{UL}=5190$ MHz), 47590 ($F_{DL}=F_{UL}=5230$ MHz), 47990 ($F_{DL}=F_{UL}=5270$ MHz), 48390 ($F_{DL}=F_{UL}=5310$ MHz), 50390 ($F_{DL}=F_{UL}=5510$ MHz), 50790 ($F_{DL}=F_{UL}=5550$ MHz), 51190 ($F_{DL}=F_{UL}=5590$ MHz), 51590 ($F_{DL}=F_{UL}=5630$ MHz), 51990 ($F_{DL}=F_{UL}=5670$ MHz), 52390 ($F_{DL}=F_{UL}=5710$ MHz)$\}$.

Using n=47190 as an example, a value of n may be offset by ±2, for example, may be n−2, n−1, n+1, or n+2. When the value of n is n−2=47188, $F_{DL}=F_{UL}=5189.8$ MHz. When the value of n is n−1=47189, $F_{DL}=F_{UL}=5189.9$ MHz. When the value of n is n+1=47191, $F_{DL}=F_{UL}=5190.1$ MHz. When the value of n is n+2=47192, $F_{DL}=F_{UL}=5190.2$ MHz. In a similar manner, more value ranges may be obtained from Set 1, the center frequency set with a channel bandwidth of 40 MHz, and a center frequency set of the following other channel bandwidths.

In addition, an example in which a value of a carrier center frequency is 5190 MHz, that is, in the foregoing set 1, a value of a center frequency corresponding to n=47190 is 5190 MHz, and two adjacent channels have a bandwidth of 40 MHz is used for description, that is, $BW_{channel(1)}=40$ MHz, $BW_{channel(2)}=40$ MHz, and $BW_{CR}=100$ KHz. When the SCS is any one of 15 KHz, 30 KHz, or 60 KHz, it may be learned, according to Formula 3, that a carrier spacing between the two adjacent channels is:

$$\text{Nominal channel spacing} = \left\lfloor \frac{40+40}{0.6} \right\rfloor 0.3 \text{ [MHz]} = 39.9 \text{ MHz}$$

Therefore, a center frequency of another 40 MHz channel is 5229.9 MHz. A channel configuration may be obtained by using a similar method and different values in the following sets.

Set 2: $N_{DL}=N_{UL}=\{n-2, n-1, n, n+1, n+2 | n=46990$ ($F_{DL}=F_{UL}=5170$ MHz), 47390 ($F_{DL}=F_{UL}=5210$ MHz), 47790 ($F_{DL}=F_{UL}=5250$ MHz), 48190 ($F_{DL}=F_{UL}=5290$ MHz), 48590 ($F_{DL}=F_{UL}=5330$ MHz), 50190 ($F_{DL}=F_{UL}=5490$ MHz), 50590 ($F_{DL}=F_{UL}=5530$ MHz), 50990 ($F_{DL}=F_{UL}=5570$ MHz), 51390 ($F_{DL}=F_{UL}=5610$ MHz), 51790 ($F_{DL}=F_{UL}=5650$ MHz), 52190 ($F_{DL}=F_{UL}=5690$ MHz)$\}$.

Set 3: $N_{DL}=N_{UL}=\{n-2, n-1, n, n+1, n+2|n=52840$ ($F_{DL}=F_{UL}=5755$ MHz), 53240 ($F_{DL}=F_{UL}=5795$ MHz), 53640 ($F_{DL}=F_{UL}=5835$ MHz), 54040 ($F_{DL}=F_{UL}=5875$ MHz)}.

Set 4: $N_{DL}=N_{UL}=\{n-2, n-1, n, n+1, n+2|n=53040$ ($F_{DL}=F_{UL}=5775$ MHz), 53440 ($F_{DL}=F_{UL}=5815$ MHz), 53840 ($F_{DL}=F_{UL}=5855$ MHz), 54240 ($F_{DL}=F_{UL}=5895$ MHz)}.

It may be understood that, when the channel bandwidth is 40 MHz, the channel center frequency set may be at least one of the foregoing sets 1 to 4, or may be a plurality of the foregoing sets 1 to 4.

For example, when the channel bandwidth is 60 MHz, an optional carrier center frequency set includes at least:

Set 5: $N_{DL}=N_{UL}=\{n-2, n-1, n, n+1, n+2|n=47090$ ($F_{DL}=F_{UL}=5180$ MHz), 47690 ($F_{DL}=F_{UL}=5240$ MHz), 48290 ($F_{DL}=F_{UL}=5300$ MHz), 50290 ($F_{DL}=F_{UL}=5500$ MHz), 50890 ($F_{DL}=F_{UL}=5560$ MHz), 51490 ($F_{DL}=F_{UL}=5620$ MHz), 52090 ($F_{DL}=F_{UL}=5680$ MHz)}.

Set 6: $N_{DL}=N_{UL}=\{n-2, n-1, n, n+1, n+2|n=47290$ ($F_{DL}=F_{UL}=5200$ MHz), 47890 ($F_{DL}=F_{UL}=5260$ MHz), 48490 ($F_{DL}=F_{UL}=5320$ MHz), 50490 ($F_{DL}=F_{UL}=5520$ MHz), 51090 ($F_{DL}=F_{UL}=5580$ MHz), 51690 ($F_{DL}=F_{UL}=5640$ MHz), 52290 ($F_{DL}=F_{UL}=5700$ MHz)}.

Set 7: $N_{DL}=N_{UL}=\{n-2, n-1, n, n+1, n+2|n=47490$ ($F_{DL}=F_{UL}=5220$ MHz), 48090 ($F_{DL}=F_{UL}=5280$ MHz), 50690 ($F_{DL}=F_{UL}=5540$ MHz), 51290 ($F_{DL}=F_{UL}=5600$ MHz), 51890 ($F_{DL}=F_{UL}=5660$ MHz)}.

Set 8: $N_{DL}=N_{UL}=\{n-2, n-1, n, n+1, n+2|n=52940$ ($F_{DL}=F_{UL}=5765$ MHz), 53540 ($F_{DL}=F_{UL}=5825$ MHz), 54140 ($F_{DL}=F_{UL}=5885$ MHz)}.

Set 9: $N_{DL}=N_{UL}=\{n-2, n-1, n, n+1, n+2|n=53140$ ($F_{DL}=F_{UL}=5785$ MHz), 53740 ($F_{DL}=F_{UL}=5845$ MHz)}.

Set 10: $N_{DL}=N_{UL}=\{n-2, n-1, n, n+1, n+2|n=53340$ ($F_{DL}=F_{UL}=5805$ MHz), 53940 ($F_{DL}=F_{UL}=5865$ MHz)}.

It may be understood that, when the channel bandwidth is 60 MHz, the channel center frequency set may be at least one of the foregoing sets 5 to 10, or may be a plurality of the foregoing sets 5 to 10.

When the carrier bandwidth is 80 MHz, an optional carrier center frequency set includes at least:

Set 11: $N_{DL}=N_{UL}=\{n-2, n-1, n, n+1, n+2|n=47390$ ($F_{DL}=F_{UL}=5210$ MHz), 48190 ($F_{DL}=F_{UL}=5290$ MHz), 50590 ($F_{DL}=F_{UL}=5530$ MHz), 51390 ($F_{DL}=F_{UL}=5610$ MHz), 52190 ($F_{DL}=F_{UL}=5690$ MHz)}.

Set 12: $N_{DL}=N_{UL}=\{n-2, n-1, n, n+1, n+2|n=47190$ ($F_{DL}=F_{UL}=5690$ MHz), 47990 ($F_{DL}=F_{UL}=5270$ MHz), 50390 ($F_{DL}=F_{UL}=5510$ MHz), 51190 ($F_{DL}=F_{UL}=5590$ MHz), 51990 ($F_{DL}=F_{UL}=5670$ MHz)}.

Set 13: $N_{DL}=N_{UL}=\{n-2, n-1, n, n+1, n+2|n=47590$ ($F_{DL}=F_{UL}=5230$ MHz), 48390 ($F_{DL}=F_{UL}=5310$ MHz), 50790 ($F_{DL}=F_{UL}=5550$ MHz), 51590 ($F_{DL}=F_{UL}=5630$ MHz)}.

Set 14: $N_{DL}=N_{UL}=\{n-2, n-1, n, n+1, n+2|n=47790$ ($F_{DL}=F_{UL}=5250$ MHz), 50790 ($F_{DL}=F_{UL}=5570$ MHz), 51790 ($F_{DL}=F_{UL}=5650$ MHz)}.

Set 15: $N_{DL}=N_{UL}=\{n-2, n-1, n, n+1, n+2|n=53040$ ($F_{DL}=F_{UL}=5775$ MHz), 53840 ($F_{DL}=F_{UL}=5855$ MHz)}.

Set 16: $N_{DL}=N_{UL}=\{n-2, n-1, n, n+1, n+2|n=53240$ ($F_{DL}=F_{UL}=5795$ MHz), 54040 ($F_{DL}=F_{UL}=5875$ MHz)}.

Set 17: $N_{DL}=N_{UL}=\{n-2, n-1, n, n+1, n+2|n=53440$ ($F_{DL}=F_{UL}=5815$ MHz)}.

Set 18: $N_{DL}=N_{UL}=\{n-2, n-1, n, n+1, n+2|n=53640$ ($F_{DL}=F_{UL}=5835$ MHz)}.

It may be understood that, when the channel bandwidth is 80 MHz, the channel center frequency set may be at least one of the foregoing sets 11 to 18, or may be a plurality of the foregoing sets 11 to 18.

When the carrier bandwidth is 100 MHz, an optional carrier center frequency set includes at least:

Set 19: $N_{DL}=N_{UL}=\{n-2, n-1, n, n+1, n+2|n=47290$ ($F_{DL}=F_{UL}=5200$ MHz), 48290 ($F_{DL}=F_{UL}=5300$ MHz), 50490 ($F_{DL}=F_{UL}=5520$ MHz), 51490 ($F_{DL}=F_{UL}=5620$ MHz)}.

Set 20: $N_{DL}=N_{UL}=\{n-2, n-1, n, n+1, n+2|n=47490$ ($F_{DL}=F_{UL}=5220$ MHz), 50690 ($F_{DL}=F_{UL}=5540$ MHz), 51690 ($F_{DL}=F_{UL}=5640$ MHz)}.

Set 21: $N_{DL}=N_{UL}=\{n-2, n-1, n, n+1, n+2|n=47690$ ($F_{DL}=F_{UL}=5240$ MHz), 50890 ($F_{DL}=F_{UL}=5560$ MHz), 51890 ($F_{DL}=F_{UL}=5660$ MHz)}.

Set 22: $N_{DL}=N_{UL}=\{n-2, n-1, n, n+1, n+2|n=47890$ ($F_{DL}=F_{UL}=5260$ MHz), 51090 ($F_{DL}=F_{UL}=5580$ MHz), 52090 ($F_{DL}=F_{UL}=5680$ MHz)}.

Set 23: $N_{DL}=N_{UL}=\{n-2, n-1, n, n+1, n+2|n=48090$ ($F_{DL}=F_{UL}=5280$ MHz), 51290 ($F_{DL}=F_{UL}=5600$ MHz)}.

Set 24: $N_{DL}=N_{UL}=\{n-2, n-1, n, n+1, n+2|n=53140$ ($F_{DL}=F_{UL}=5785$ MHz)}.

Set 25: $N_{DL}=N_{UL}=\{n-2, n-1, n, n+1, n+2|n=53340$ ($F_{DL}=F_{UL}=5805$ MHz)}.

Set 26: $N_{DL}=N_{UL}=\{n-2, n-1, n, n+1, n+2|n=53540$ ($F_{DL}=F_{UL}=5825$ MHz)}.

Set 27: $N_{DL}=N_{UL}=\{n-2, n-1, n, n+1, n+2|n=53740$ ($F_{DL}=F_{UL}=5845$ MHz)}.

Set 28: $N_{DL}=N_{UL}=\{n-2, n-1, n, n+1, n+2|n=53940$ ($F_{DL}=F_{UL}=5865$ MHz)}.

It may be understood that, when the channel bandwidth is 100 MHz, the channel center frequency set may be at least one of the foregoing sets 19 to 28, or may be a plurality of the foregoing sets 19 to 28.

When the carrier bandwidth is 160 MHz, an optional carrier center frequency set is at least one of the following sets or a combination of a plurality of the following sets:

Set 1: $N_{DL}=N_{UL}=\{n-2, n-1, n, n+1, n+2|n=47790$ (5250 MHz), 50990 (5570 MHz)}.

Set 2: $N_{DL}=N_{UL}=\{n-2, n-1, n, n+1, n+2|n=47590$ (5230 MHz), 47990 (5270 MHz), 50790 (5550 MHz), 51190 (5590 MHz), 51390 (5610 MHz), 51590 (5630 MHz), 51790 (5650 MHz)}.

Set 3: $N_{DL}=N_{UL}=\{n-2, n-1, n, n+1, n+2|n=53640$ (5835 MHz)}.

Set 4: $N_{DL}=N_{UL}=\{n-2, n-1, n, n+1, n+2|n=53440$ (5815 MHz)}.

In an application scenario of an unlicensed frequency band, in some implementations, bandwidth utilization needs to meet a requirement of an occupied channel bandwidth (OCB). For uplink transmission, a structure based on a non-even interlace may be used. To be specific, a spacing (referred to as an interlace spacing) between two adjacent RBs in a resource interlace is fixed, but quantities of RBs included in different interlaces may be different. One resource interlace includes a plurality of resource blocks that are distributed at intervals in a system bandwidth. For example, assuming that the system bandwidth is 106 RBs, and an interlace structure in which an interlace spacing is 10 RBs is used, six interlaces include 11 RBs, and the remaining four interlaces include 10 RBs. Specifically, in different subcarrier spacings and different system bandwidth scenarios, a value of the interlace spacing may be selected according to the following table. In the table, [a, b] indicates all positive integers in a closed interval of a to b, and N/A indicates that a scenario is not supported. The values in the table are calculated as follows:

[(⌊$N_{RB}$/interlace_spacing⌋−1)*interlace_spacing+1]
*$RB_{bandwidth}$>$p_{OCB}$*BW $N_{RB}$ is a quantity of RBs corresponding to a system transmission bandwidth, interlace_spacing indicates an interlace spacing, $RB_{bandwidth}$ is a bandwidth of one RB, $p_{OCB}$ is a proportion of an actual transmission bandwidth required by an OCB regulation to a claimed bandwidth. For example, $p_{OCB}$ corresponding to a low frequency is 80%, $p_{OCB}$ corresponding to a high frequency is 70%, and BW is a system bandwidth. For example, a subcarrier spacing is 15 kHz and a system bandwidth is 20 MHz, that is, BW=20 MHz. Assuming that a corresponding transmission bandwidth $N_{RB}$ is 106 RBs, a value of an interlace spacing that meets the foregoing formula is 1, 2, 3, 4, 5, 6, 7, 8, 9, 10, 11, 13, or 15. In different implementations, one or more suitable values may be selected from the value range.

For another system bandwidth, in a subcarrier spacing scenario, a corresponding interlace spacing value range may be obtained from the foregoing table, and then one or more values are selected from the value range. In a implementation, in a low frequency scenario, for a 15 kHz subcarrier spacing scenario, an interlace structure in which an interlace spacing is 10 is used for different system bandwidths (for example, 20 MHz, 40 MHz, 60 MHz, 80 MHz, 100 MHz, and 160 MHz). For a 30 kHz subcarrier spacing scenario, an interlace structure in which an interlace spacing is 5 is used for different system bandwidths (for example, 20 MHz, 40 MHz, 60 MHz, 80 MHz, 100 MHz, and 160 MHz). For a 60 kHz subcarrier spacing scenario, an interlace structure in which an interlace spacing is 2 is used for different system bandwidths (for example, 20 MHz, 40 MHz, 60 MHz, 80 MHz, 100 MHz, and 160 MHz). In a high-frequency scenario, for a 60 kHz subcarrier spacing scenario, an interlace structure in which an interlace spacing is 20 is used for different system bandwidths (for example, 100 MHz, 200 MHz, and 400 MHz). For a 120 kHz subcarrier spacing scenario, an interlace structure in which an interlace spacing is 10 is used for different system bandwidths (for example, 100 MHz, 200 MHz, and 400 MHz). In another possible implementation, in a low frequency scenario, for a 20 MHz system bandwidth, interlace structures in which interlace spacings are 10, 5, and 2 are respectively used for subcarrier spacings of 15 kHz, 30 kHz, and 60. For a 40 MHz system bandwidth, interlace structures in which interlace spacings are 20, 10, and 5 are respectively used for subcarrier spacings of 15 kHz, 30 kHz, and 60 kHz. For a 60 MHz system bandwidth, interlace structures in which interlace spacings are 15 and 7 are respectively used for subcarrier spacings of 30 kHz and 60 kHz. For an 80 MHz system bandwidth, interlace structures in which interlace spacings are 20 and 10 are respectively used for subcarrier spacings of 30 kHz and 60 kHz. In a high-frequency scenario, for a 100 MHz system bandwidth, interlaces structures in which interlace spacings are 20 and 10 are respectively used for subcarrier spacings of 60 kHz and 120 kHz. For a 200 MHz system bandwidth, interlaces structures in which interlace spacings are 40 and 20 are respectively used for subcarrier spacings of 60 kHz and 120 kHz. For a 400 MHz system bandwidth, an interlace structure in which an interlace spacing is 40 is used for a subcarrier spacings of 120 kHz.

Some other implementations may be selected based on the system bandwidth, the corresponding subcarrier spacing, and values provided in the following table. Details are not described herein again.

TABLE 3

Value table of low frequency resource interlace spacings

| SCS (kHz) | 20 MHz Interlace spacing | 40 MHz Interlace spacing | 60 MHz Interlace spacing | 80 MHz Interlace spacing | 100 MHz Interlace spacing |
|---|---|---|---|---|---|
| 15 | [1, 11] & 13, 15 | [1, 21] & 23, 24, 26, 27, 30, 36 | N/A | N/A | N/A |
| 30 | [1, 5] | [1, 11] & 13, 15 | [1, 20] & 23, 27 | [1, 21] & 23, 24, 26, 27, 30, 31, 36 | [1, 30] & 32, 33, 34, 37, 38, 39, 45 |
| 60 | [1, 2] | [1, 5] | [1, 7] & 11 | [1, 11] & 13, 15 | [1, 16] & 19 |

TABLE 4

Value table of high frequency resource interlace spacings

| SCS (kHz) | 100 MHz Interlace spacing | 200 MHz Interlace spacing | 400 MHz Interlace spacing |
|---|---|---|---|
| 60 | [1, 18] & 20, 21 22, 25, 26, 33 | [1, 37] & 39, 40, 41, 42, 43, 44, 49, 50, 51, 52, 65, 66 | N/A |
| 120 | [1, 13] & 16 | [1, 18] & 20, 21, 22, 25, 26, 33 | [1, 37] & 30, 40, 41, 42, 43, 44, 49, 50, 51, 52, 65, 66 |

The foregoing describes in detail implementations of the communication method in this application. The following continues to describe implementations of the network device and the terminal device in this application.

An implementation of the network device is first described. In a specific example, a structure of the network device includes a processor (or referred to as a controller) and a transceiver. In a possible example, the structure of the network device may further include a communications unit. The communications unit is configured to support communication with another network-side device, such as communication with a core network node. In a possible example, the structure of the network device may further include a memory. The memory is coupled to the processor and is configured to store a program instruction and data that are necessary for the network device.

Figure 8:
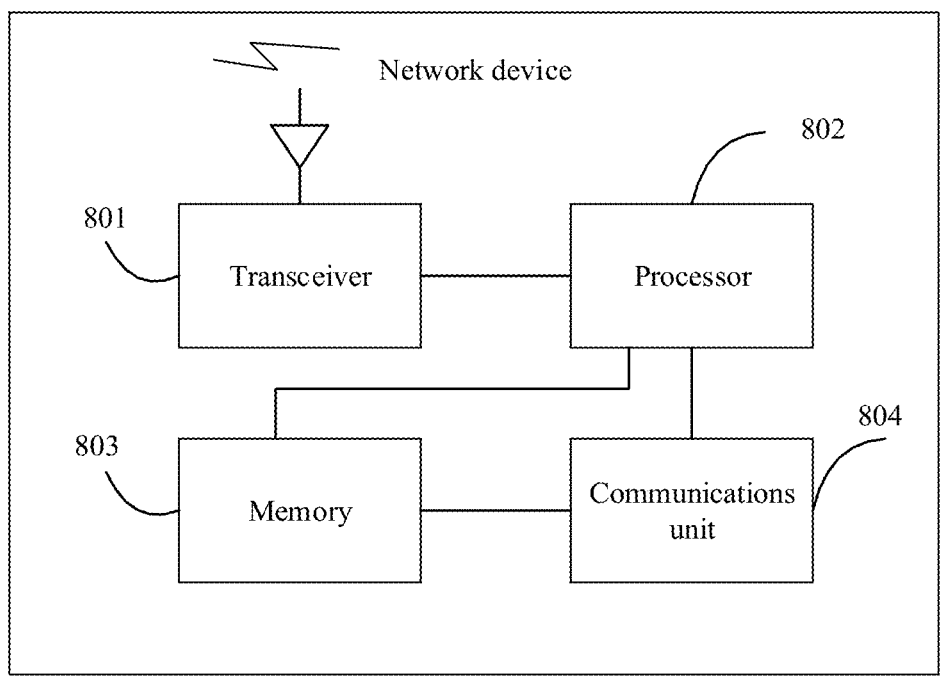
FIG. 8 is a simplified schematic diagram of a network device according to an embodiment of this application.

FIG. 8 is a possible simplified schematic structural diagram of the network device in the foregoing implementations. In an example corresponding to FIG. 8, a structure of the network device in this application includes a transceiver 801, a processor 802, a memory 803, and a communications unit 804. The transceiver 801, the processor 802, the memory 803, and the communications unit 804 are connected by using a bus.

On a downlink, to-be-sent data or signaling (including the foregoing downlink control information) is adjusted by the transceiver 801 to output a sample and generate a downlink signal. The downlink signal is transmitted to the terminal device in the foregoing embodiments by using an antenna. On an uplink, the antenna receives an uplink signal transmitted by the terminal device in the foregoing embodiments. The transceiver 802 adjusts the signal received from the antenna, and provides an input sample. In the processor 802, service data and a signaling message are processed, for example, modulating to-be-sent data and generating an SC-FDMA symbol. These units perform processing based on a radio access technology (for example, an access technology in LTE, 5G, and another evolved system) used by a radio access network. In an implementation shown in FIG. 7, the transceiver 802 is integrated by a transmitter and a receiver. In another implementation, the transmitter and the receiver may alternatively be independent of each other.

The processor 802 is further configured to control and manage actions of the network device, to perform processing performed by the network device in the foregoing embodiments, for example, controlling the network device to process channel configuration and/or to perform another process of the technology described in this application. In an example, the processor 802 is configured to support the network device in performing processing processes related to the network device in FIG. 2 to FIG. 7, for example, steps 301 and 302. When the processor 802 is applied to an unlicensed scenario, the processor 802 performs channel listening and obtains channel occupancy time through contention. For example, the processor 802 performs channel listening based on a signal received by the transceiver 802 from the antenna, and controls the transceiver to send a signal by using the antenna to occupy a channel. In different implementations, the processor 802 may include one or more processors, for example, include one or more central processing units (CPU). The processor 802 may be integrated into a chip, or may be a chip.

The memory 803 is configured to store a related instruction and data, and program code and data that are of the network device. In different implementation, the memory 803 includes but is not limited to a random access memory (RAM), a read-only memory (ROM), an erasable programmable read-only memory (EPROM), or a portable read-only memory (CD-ROM).

It can be understood that FIG. 8 shows merely a simplified design of the network device. In actual application, the network device may include any quantities of transmitters, receivers, processors, memories, and the like. All network devices that can implement this application fall within the protection scope of this application.

The following describes an implementation of the terminal device. In a specific example, a structure of the terminal device includes a processor (or referred to as a controller), a transceiver, and a modem processor. In a possible example, the structure of the network device may further include a memory. The memory is coupled to the processor and is configured to store a program instruction and data that are necessary for the network device.

Figure 9:
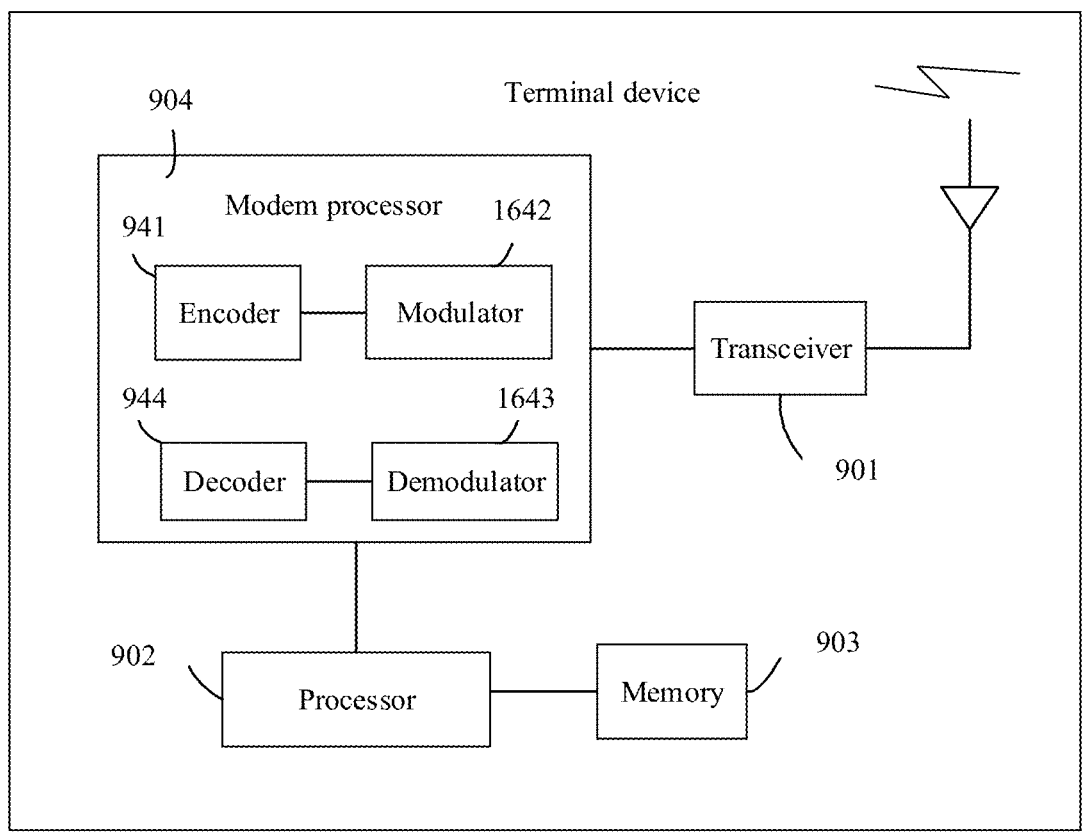
FIG. 9 is a simplified schematic diagram of a terminal device according to an embodiment of this application.

FIG. 9 is a simplified schematic diagram of a possible design structure of the terminal device in the foregoing embodiments. The terminal device includes a transceiver 901, a processor 902, a memory 903, and a modem processor 904. The transceiver 901, the processor 902, the memory 903, and the modem processor 904 are connected by using a bus.

The transceiver 901 adjusts (for example, performs analog conversion, filtering, amplification, and up-conversion on) an output sample and generates an uplink signal. The uplink signal is transmitted to the network device in the foregoing embodiments by using an antenna. On a downlink, the antenna receives a downlink signal transmitted by the base station in the foregoing embodiments. The transceiver 901 adjusts (for example, performs filtering, amplification, down-conversion, and digitization on) the signal received from the antenna and provides an input sample. For example, in the modem processor 904, an encoder 9041 receives service data and a signaling message that are to be sent on an uplink, and processes (for example, performs formatting, encoding, and interleaving on) the service data and the signaling message. A modulator 9042 further processes (for example, performs symbol mapping and modulation on) encoded service data and signaling message, and provides an output sample. A demodulator 9043 processes (for example, demodulates) the input sample and provides symbol estimation. A decoder 9044 processes (for example, de-interleaves and decodes) the symbol estimation and provides decoded data and a decoded signaling message that are to be sent to the terminal device. The encoder 9041, the modulator 9042, the demodulator 9043, and the decoder 9044 may be implemented by a combined modem processor 904. These units perform processing based on a radio access technology (for example, an access technology in LTE, 5G, and another evolved system) used by a radio access network. In an implementation shown in FIG. 9, the transceiver 901 is integrated by a transmitter and a receiver. In another implementation, the transmitter and the receiver may alternatively be independent of each other.

The processor 902 controls and manages actions of the terminal device, to perform processing performed by the terminal device in the foregoing embodiments. For example, the processor 902 is configured to control the terminal device to perform, based on received paging indication information, processing and/or another process of the technology described in the present invention. In an example, the processor 902 is configured to support the terminal device in performing the processing processes related to the terminal device in FIG. 2 to FIG. 7. For example, the transceiver 901 is configured to receive, by using an antenna, downlink control information sent by the network device, and the processor 902 is configured to control, based on the downlink control information, the transceiver to search for and receive a synchronization signal by using the antenna. In different implementations, the processor 902 may include one or more processors, for example, include one or more CPUs. The processor 902 may be integrated into a chip, or may be a chip.

The memory 903 is configured to store a related instruction and data, and program code and data that are of the terminal device. In different implementation, the memory 903 includes but is not limited to a random access memory (RAM), a read-only memory (ROM), an erasable programmable read-only memory (EPROM), or a portable read-only memory (CD-ROM).

It may be understood that FIG. 9 shows merely a simplified design of the terminal device. In actual application, the terminal device may include any quantities of transmitters, receivers, processors, memories, and the like. All terminal devices that can implement this application fall within the protection scope of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person skilled in the art should be aware that in the foregoing one or more examples, functions described in this application may be implemented by hardware, software, firmware, or any combination thereof. When this application is implemented by the software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

What is claimed is:

1. A communication method comprising:
   determining, by a network device, at least two channels, wherein a spacing between center frequencies of two adjacent channels in the at least two channels is a positive integer multiple of a subcarrier spacing or a positive integer multiple of a resource block (RB) spacing; and
   communicating, by the network device, by using at least one of the at least two channels,
   wherein an uplink resource on the at least one of the at least two channels is based on an interlace structure, and a first quantity of RBs included in a first interlace of the interlace structure is different from a second quantity of RBs included in one or more other interlaces of the interlace structure,
   wherein the spacing between center frequencies of the two adjacent channels is 19.98 MHz, and a bandwidth of the two adjacent channels is 20 MHz; or the spacing between center frequencies of the two adjacent channels is 39.96 MHz, and the bandwidth of the two adjacent channels is 40 MHz.

2. The communication method according to claim 1, wherein the spacing between center frequencies of two adjacent channels in the at least two channels meets the following formula:

Nominal channel spacing =
$$\left\lfloor \frac{BW_{channel(1)} + BW_{channel(2)}}{2 * LCM(BW_{CR}, SCS)} \right\rfloor LCM(BW_{CR}, SCS)[MHz]; \text{ or}$$

Nominal channel spacing =
$$\left\lceil \frac{BW_{channel(1)} + BW_{channel(2)}}{2 * LCM(BW_{CR}, SCS)} \right\rceil LCM(BW_{CR}, SCS)[MHz],$$

wherein Nominal channel spacing indicates a spacing between center frequencies of two channels, $B_{channel(1)}$ and $BW_{channel(2)}$ separately indicate bandwidths of two carriers, $BW_{CR}$ indicates a channel raster, SCS indicates a subcarrier spacing, and LCM($BW_{CR}$,SCS) indicates a least common multiple of $BW_{CR}$ and SCS.

3. The communication method according to claim 1, wherein the quantity of RBs included in each interlace of the interlace structure is 10 or 11.

4. A communication method comprising:
   searching, by a terminal device, for a synchronization signal from a network device to perform random access; and
   communicating, by the terminal device, on at least two channels when accessing the network device, wherein a spacing between center frequencies of each channel and a corresponding adjacent channel of the at least two channels that are configured by the network device is a positive integer multiple of a subcarrier spacing or a positive integer multiple of a resource block (RB),
   wherein an uplink resource on the at least two channels is based on an interlace structure, and a first quantity of RBs included in a first interlace of the interlace structure is different from a second quantity of RBs included in one or more other interlaces of the interlace structure,
   wherein the spacing between center frequencies of the two adjacent channels is 19.98 MHz, and a bandwidth of the two adjacent channels is 20 MHz; or the spacing between center frequencies of the two adjacent channels is 39.96 MHz, and the bandwidth of the two adjacent channels is 40 MHz.

5. The communication method according to claim 4, wherein the spacing between center frequencies of each channel and a corresponding adjacent channel of the at least two channels meets the following formula:

Nominal channel spacing =
$$\left\lfloor \frac{BW_{channel(1)} + BW_{channel(2)}}{2 * LCM(BW_{CR}, SCS)} \right\rfloor LCM(BW_{CR}, SCS)[MHz]; \text{ or}$$

Nominal channel spacing =
$$\left\lceil \frac{BW_{channel(1)} + BW_{channel(2)}}{2 * LCM(BW_{CR}, SCS)} \right\rceil LCM(BW_{CR}, SCS)[MHz],$$

wherein Nominal channel spacing indicates a spacing between center frequencies of two carriers, $B_{channel(1)}$ and $BW_{channel(2)}$ separately indicate bandwidths of two carriers, $BW_{CR}$ indicates a channel raster, SCS indicates a subcarrier spacing, and LCM($BW_{CR}$,SCS) indicates a least common multiple of $BW_{CR}$ and SCS.

6. The communication method according to claim 4, wherein the quantity of RBs included in each interlace of the interlace structure is 10 or 11.

7. A network device comprising:
   a processor configured to determine at least two channels, wherein a spacing between center frequencies of two adjacent channels in the at least two channels is a positive integer multiple of a subcarrier spacing or a positive integer multiple of a resource block (RB) spacing; and
   a transceiver configured to communicate by using at least one of the at least two channels,
   wherein an uplink resource on the at least one of the at least two channels is based on an interlace structure, and a first quantity of RBs included in a first interlace of the interlace structure is different from a second quantity of RBs included in one or more other interlaces of the interlace structure,
   wherein the spacing between center frequencies of the two adjacent channels is 19.98 MHz, and a bandwidth of the two adjacent channels is 20 MHz; or the spacing between center frequencies of the two adjacent channels is 39.96 MHz, and the bandwidth of the two adjacent channels is 40 MHz.

8. The network device according to claim 7, wherein the spacing between center frequencies of two adjacent channels in the at least two channels meets the following formula:

Nominal channel spacing =
$$\left\lfloor \frac{BW_{channel(1)} + BW_{channel(2)}}{2*LCM(BW_{CR}, SCS)} \right\rfloor LCM(BW_{CR}, SCS)[\text{MHz}]; \text{ or}$$

Nominal channel spacing =
$$\left\lceil \frac{BW_{channel(1)} + BW_{channel(2)}}{2*LCM(BW_{CR}, SCS)} \right\rceil LCM(BW_{CR}, SCS)[\text{MHz}],$$

wherein Nominal channel spacing indicates a spacing between center frequencies of two channels, $BW_{channel(1)}$ and $BW_{channel(2)}$ separately indicate bandwidths of two carriers, $BW_{CR}$ indicates a channel raster, SCS indicates a subcarrier spacing, and $LCM(BW_{CR}, SCS)$ indicates a least common multiple of $BW_{CR}$ and SCS.

9. The network device according to claim 7, wherein the quantity of RBs included in each interlace of the interlace structure is 10 or 11.

10. A terminal device, comprising:
a transceiver configured to search for a synchronization signal from a network device to perform random access; and
a processor configured to control the transceiver to communicate on at least two channels when accessing the network device, wherein a spacing between center frequencies of each channel and a corresponding adjacent channel of the at least two channels that are configured by the network device is a positive integer multiple of a subcarrier spacing or a positive integer multiple of a resource block (RB),
wherein an uplink resource on the at least two channels is based on an interlace structure, and a first quantity of RBs included in a first interlace of the interlace structure is different from a second quantity of RBs included in one or more other interlaces of the interlace structure,
wherein the spacing between center frequencies of the two adjacent channels is 19.98 MHz, and a bandwidth of the two adjacent channels is 20 MHz; or the spacing between center frequencies of the two adjacent channels is 39.96 MHz, and the bandwidth of the two adjacent channels is 40 MHz.

11. The terminal device according to claim 10, wherein the spacing between center frequencies of each channel and the corresponding adjacent channel of the at least two channels meets the following formula:

Nominal channel spacing =
$$\left\lfloor \frac{BW_{channel(1)} + BW_{channel(2)}}{2*LCM(BW_{CR}, SCS)} \right\rfloor LCM(BW_{CR}, SCS)[\text{MHz}]; \text{ or}$$

Nominal channel spacing =
$$\left\lceil \frac{BW_{channel(1)} + BW_{channel(2)}}{2*LCM(BW_{CR}, SCS)} \right\rceil LCM(BW_{CR}, SCS)[\text{MHz}],$$

wherein Nominal channel spacing indicates a spacing between center frequencies of two carriers, $B_{channel(1)}$ and $BW_{channel(2)}$ separately indicate bandwidths of two carriers, $BW_{CR}$ indicates a channel raster, SCS indicates a subcarrier spacing, and $LCM(BW_{CR}, SCS)$ indicates a least common multiple of $BW_{CR}$ and SCS.

12. The terminal device according to claim 10, wherein the quantity of RBs included in each interlace of the interlace structure is 10 or 11.

\* \* \* \* \*

UNITED STATES PATENT AND TRADEMARK OFFICE
CERTIFICATE OF CORRECTION

| | |
|---|---|
| PATENT NO. | : 11,405,168 B2 |
| APPLICATION NO. | : 16/875810 |
| DATED | : August 2, 2022 |
| INVENTOR(S) | : Zhu et al. |

It is certified that error appears in the above-identified patent and that said Letters Patent is hereby corrected as shown below:

On the Title Page

Page 2: item (56) U.S. Patent Documents, Column 1, Line 7: "2019/0223180 A1* 7/2019 Feh" should read -- 2019/0223180 A1* 7/2019 Fehrenbach --.

Signed and Sealed this
Twentieth Day of December, 2022

Katherine Kelly Vidal
*Director of the United States Patent and Trademark Office*